(12) United States Patent  
Rink

(10) Patent No.: US 7,839,009 B2
(45) Date of Patent: Nov. 23, 2010

(54) BUOYANT BLADE FREE STREAM TIDAL POWER DEVICE

(76) Inventor: Philip A Rink, 250 Durr Rd., Camano Island, WA (US) 98282

( * ) Notice: Subject to any disclaimer, the term of this patent is extended or adjusted under 35 U.S.C. 154(b) by 0 days.

(21) Appl. No.: 12/392,369

(22) Filed: Feb. 25, 2009

(65) Prior Publication Data

US 2009/0218822 A1    Sep. 3, 2009

Related U.S. Application Data

(60) Provisional application No. 61/032,392, filed on Feb. 28, 2008.

(51) Int. Cl.
*F03B 13/00* (2006.01)

(52) U.S. Cl. ............... 290/54; 290/43; 290/44; 290/53; 60/398; 60/495

(58) Field of Classification Search .......... 290/42, 290/43, 54, 53; 60/398, 495
See application file for complete search history.

(56) References Cited

U.S. PATENT DOCUMENTS

| | | | | |
|---|---|---|---|---|
| 6,392,314 B1 * | 5/2002 | Dick | ........................... | 290/53 |
| 7,023,104 B2 * | 4/2006 | Kobashikawa et al. | ........ | 290/42 |
| 7,045,912 B2 * | 5/2006 | Leijon et al. | .................. | 290/42 |
| 7,245,041 B1 * | 7/2007 | Olson | ........................... | 290/53 |
| 7,293,960 B2 * | 11/2007 | Yamamoto et al. | ............ | 416/85 |

\* cited by examiner

*Primary Examiner*—T C Patel
*Assistant Examiner*—Iraj A Mohandesi
(74) *Attorney, Agent, or Firm*—Clark A. Puntigam; Jensen & Puntigam, P.S.

(57) ABSTRACT

Accordingly, the system for extracting power from tidal or other water action in a water region having a bottom surface, comprises: a base assembly positionable on the bottom surface of the water region; a buoyant blade assembly mounted on the base assembly, the blade assembly including at least one buoyant blade member, wherein the blade assembly or the blade member is capable of oscillating through an angle, wherein the buoyant blade member is mounted such that when the base assembly is positioned properly in the water region relative to the direction of the tide or other water action, torque is generated by the oscillating movement of the buoyant blade assembly or the buoyant blade member, and wherein the base assembly includes a power-extracting mechanism responsive to the torque generated by the tide or other action of water or the buoyant blade assembly; and a system for coupling the torque to the power-extracting mechanism.

16 Claims, 4 Drawing Sheets

BUOYANT BLADE FREE STREAM TIDAL POWER DEVICE

TECHNICAL FIELD

This invention relates to the field of extracting power from moving streams of water. These moving streams of water are typically either tidal flows resulting from landmasses acting on the rise and fall of the tides, or riverine flows resulting from water flowing downstream.

BACKGROUND OF THE INVENTION

As seawater sloshes in and out of inlets under the influence of the moon's gravitational pull, currents are created. These water currents contain substantial amounts of kinetic energy that can be harvested at predictable times to provide power, usually in the form of electricity. River flows are also potential sources of "tidal" power.

Tidal or riverine currents are often low-density power sources, flowing at 3-5 knots or less. This makes the power difficult to extract efficiently. Hydroelectric dams and their coastal cousins the barrage plants amplify the energy density of the water and then harvest the energy using high-pressure, high-velocity turbines. In the process they modify the environment they utilize, often displacing or destroying native ecosystems.

Free-stream turbines have been proposed or deployed that are designed using modern windmill concepts. These "water-windmills" are installed in high-current areas to take advantage of the higher energy density. High current areas are typically "choke points" with lots of marine/riverine mammal, fish, and boat traffic. The choke points are also, in the case of tidal power, highly variable, with reversing currents running from zero to 15 knots or more. It is very difficult to design a turbine to be efficient or even effective in such a variable environment.

In many areas water flows carry debris such as fishing nets and fishing lines, kelp fronds or stalks (which can be extremely tough and entangling), boat anchors and anchor lines, and deadheads and other floating wood. This debris can not only clog or jam the mechanism of a water-windmill, but can build up on the structure or anchoring system significantly increasing the load on the foundation and requiring complicated intervention using divers or underwater vehicles to correct. It is even conceivable that a large water-windmill could snag a small boat's anchor line or fishing nets and pull it under the water.

Water-windmills are usually designed with high Reynolds number, high-efficiency blades. The blades are long and thin, with sharp leading edges. They rotate at fairly high speeds (relative to the marine environment and the animals that live there) with high tip velocities causing damage to either the turbine blade or the struck object in the event of a collision. If the struck object is a small tree (deadhead), only monetary damage is sustained. If the struck object is a whale or a school of migrating salmon, the carnage and subsequent adverse publicity could easily destroy the local tidal power industry.

If a free-stream tidal plant were to cause significant ecological damage, even perceived damage, it would be subject to eco-terrorism and "monkey-wrenching". Water-windmills would be extremely easy to damage or destroy. Buoy-hung chains launched elsewhere that follow the current into the turbine area will become entangled, requiring difficult servicing or equipment replacement.

Even if a site is chosen that has little or no existing marine life, the very existence of the power plant will create an artificial reef. Various installations (offshore oil rigs, for example) around the world have shown that artificial structure in a "desolate" underwater location soon creates it's own local ecosystem. Filter feeders growing on the foundation and moving parts attract small predatory fish and crabs, eddies and current upsets attract migratory animals, and larger species will soon follow. Power generation installations must be sensitive to all affected marine life, even attracted by the system itself.

A solution is proposed that provides for the extraction of power from flows away from choke points that is not overly susceptible to fouling from debris and that minimizes damage or deleterious effects to the surrounding environment and ecosystem. In addition, the "normal" requirements for low maintenance in an extremely hostile environment and overall cost effectiveness still apply and are addressed.

SUMMARY OF THE INVENTION

Two forms of the invention are described. In either form, the new approach keeps the single blade turbine vertical in the current stream using the blade's own buoyancy. A hinge at the base allows the blade to deflect and "shrug off" kelp or other debris, eliminating the requirement for a huge foundation, mounting pole, or guy wires. The use of a freely mounted, buoyant blade also allows the blade to pivot and safely unload during extremely high currents, protecting the structure while still generating power.

The first form is similar to a canoeist in a moving boat sticking her paddle straight down into the water. If she twists the handle of her paddle the blade of the paddle is acted on by the moving water, pulling the paddle to one side. By holding her upper hand still and alternately twisting the paddle blade left and right, the paddle will pull from side to side, rotating around her hand. We have all performed a similar task by holding our hand out the window of a moving car. As we twist our wrist, our hand is pulled up and down by the actions of the wind stream.

The second form of the new approach is more like a wakeboarder being towed behind a boat. As the wakeboarder changes the angle of his board relative to the water stream, he is alternatively pulled back and forth across the wake. He rotates around the point where the rope attaches to the boat.

DESCRIPTION OF THE INVENTION

The invention is a method and device for extracting power from a fluid flow stream by projecting a lifting surface into the stream, having the flow stream act on the surface to produce a force. That force acts through a distance, the power created is harvested through a linkage, mechanism, or device, and the harvested power is then transported to a different location and used to perform (hopefully) useful work.

In this case, the lifting surface is held into the flow stream through the force of it's own buoyancy. In this way the requirement for a large foundation is reduced or eliminated.

Embodiment 1

Horizontal Power Axis Parallel to Flow Stream

Figure 1:
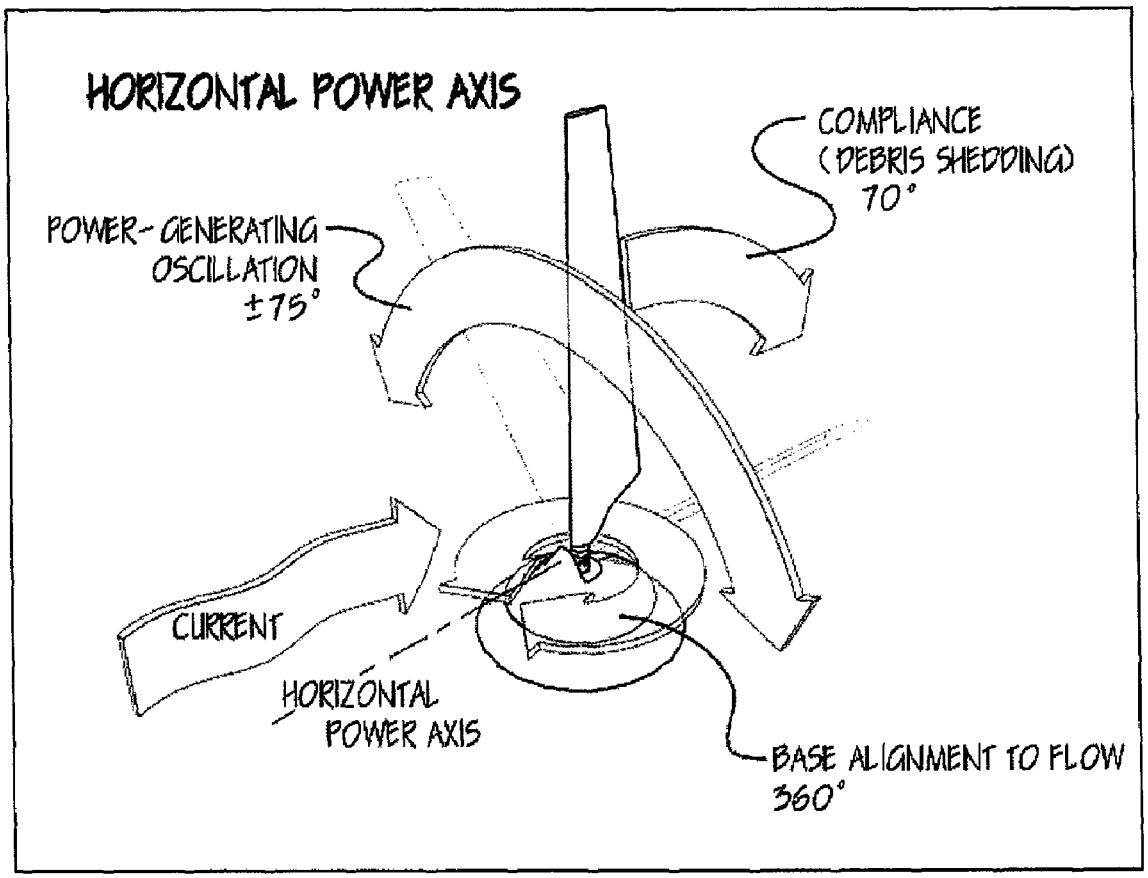
FIG. 1 is an overall view of the system with a horizontal power axis.

In its first form, shown in FIG. 1, the new system is a single blade or wing that projects upward from a base or foundation on or in the sea floor. The blade is oriented to the prevailing current flow, and its pitch is controlled to make the blade swing to and fro across the current. Power is extracted by resisting the torque created by the blade where it attaches to the base.

Figure 3:
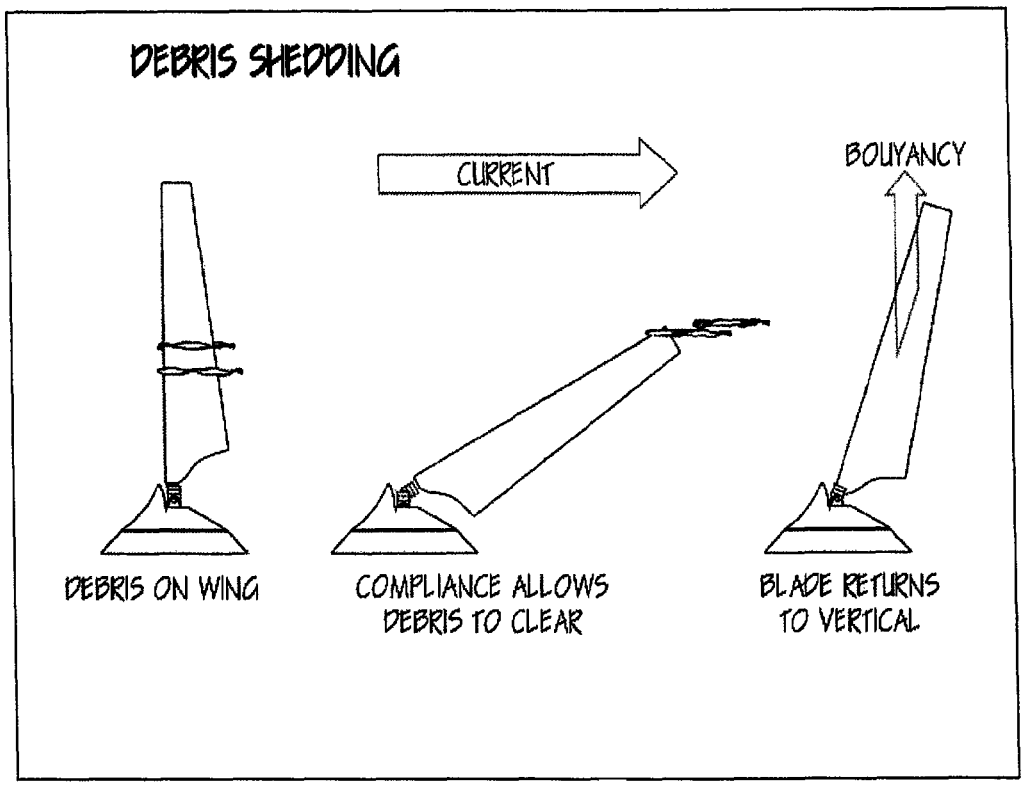
FIG. 3 is a schematic of how the buoyant blade sheds kelp or other debris.

A key feature of the new system is that the blade is buoyant and is mounted compliantly in the current-flow axis. Kelp or debris that entangles the blade will increase drag on the blade, causing it to lean back until the debris clears itself (FIG. 3). The blade will also lean back in very high-current events, unloading the blade and preventing structural damage. In addition, the loads on the system's base or foundation are greatly reduced since buoyancy keeps the blade in the current stream, not a force imposed through the foundation. Variable-buoyancy can be employed (by pumping air or other gas or buoyant medium in and out of a hollow blade, for instance) to make the blade more buoyant to generate power, but less buoyant if fouling is detected to allow the systems to quickly "shrug-off" the fouling material. The blade is more of an oscillating wing than a propeller blade. It moves slowly, generating little parasitic drag but huge amounts of torque. That torque is harvested at the root of the blade using conventional means such as a directly coupled generator, a gearbox/generator or hydraulic motor/generator. Of course, an alternator could be used instead of a generator.

Figure 4:
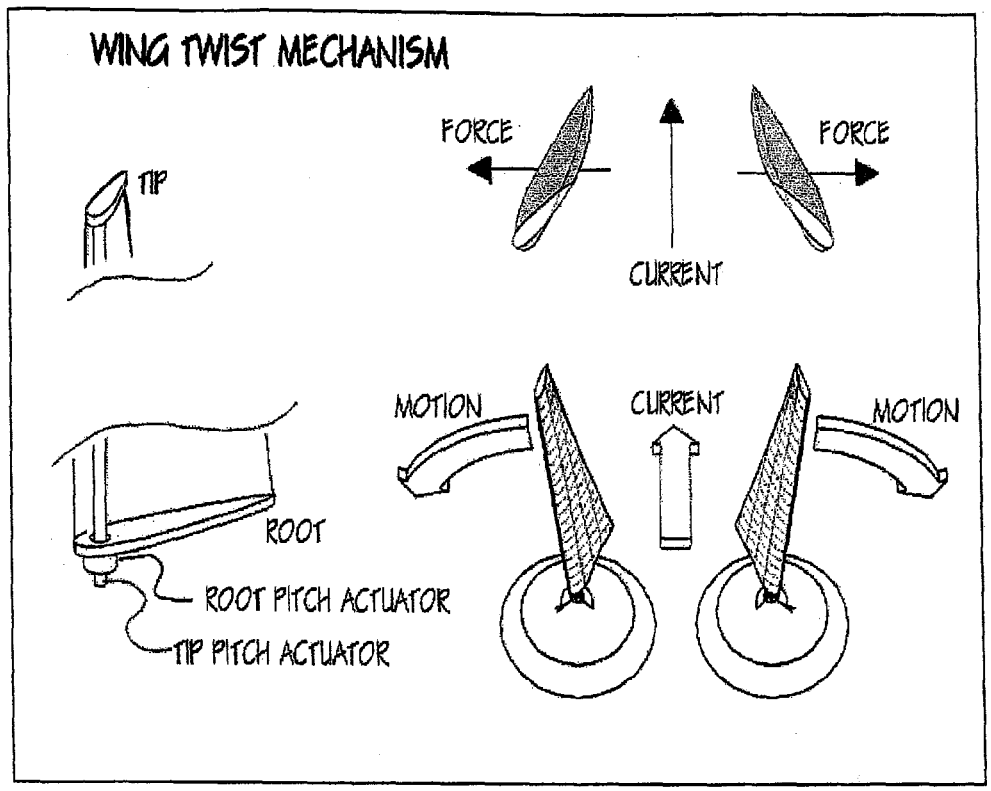
FIG. 4 is a view of how the blade can be twisted to change pitch along the blade.

Operating each portion of the blade at an optimal angle of attack (affected by blade velocity at a point plus stream velocity, added as vectors) increases the hydrodynamic efficacy. Multiple actuators can twist the blade either piece-wise or, if the blade is torsionally flexible, by twisting the entire blade (FIG. 4).

Figure 5:
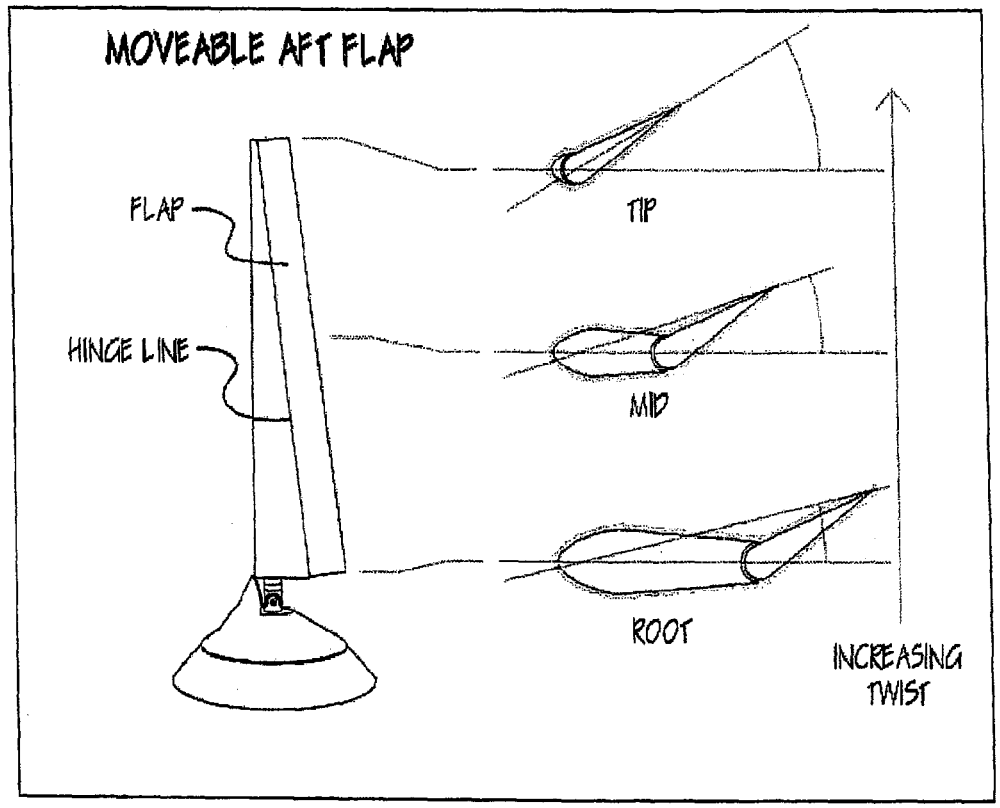
FIG. 5 is a view of how a moveable flap can be used to simulate blade twist

Another approach to address the requirement for "twist" in the single blade is to use an axially fixed tapered forward section together with a moveable aft flap. As the flap alternates from side-to-side, the entire blade acts as a variable-camber wing maintaining a roughly constant angle-of-attack along its length (FIG. 5).

The blade's buoyancy opposes torque once the blade passes vertical and heads down toward the sea floor, but that torque returns to the system as the twist in the blade is reversed and the blade heads back to again pass through vertical. In fact, the buoyancy force helps slow the blade as it approaches reversal and also helps accelerate the blade as it begins moving in the opposite direction.

The blade sweeps through approximately 90-160 degrees.

Embodiment 2

Vertical Power Axis at Right Angles to Flow Stream

Figure 2:
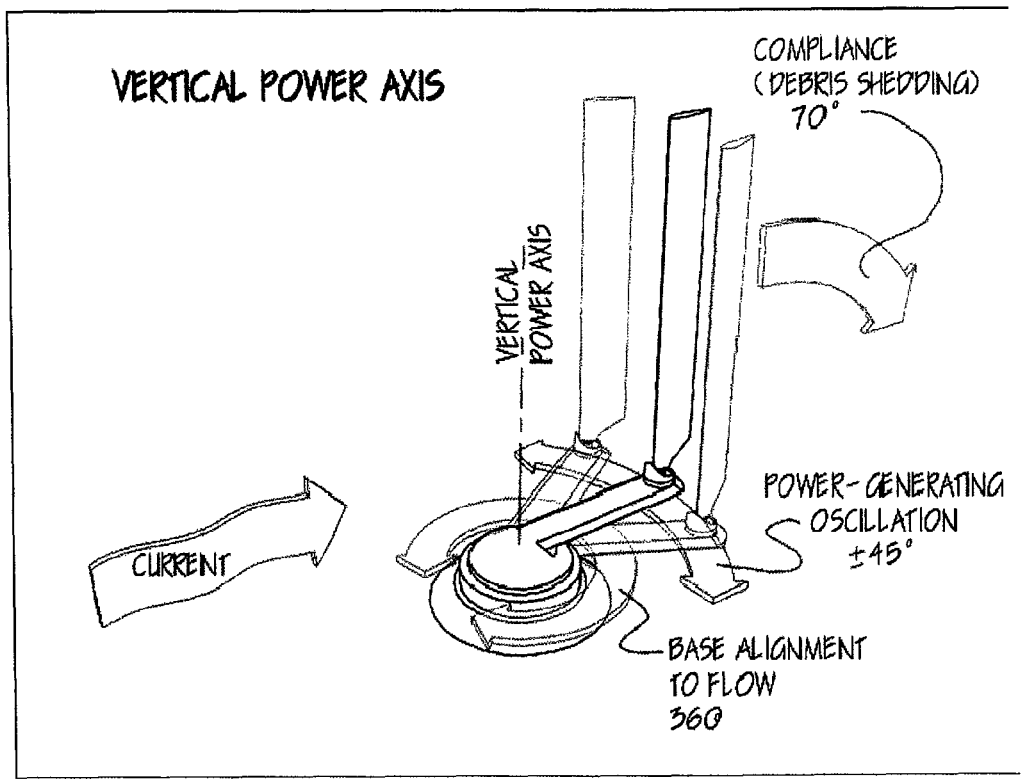
FIG. 2 is an overall view of the system with a vertical power axis.

Placing the power axis vertically, normal to the current flow, and having the vertical blade oscillate in an arc behind and around the power axis creates interesting opportunities worth investigating (FIG. 2). The blade will still shed debris and excess load though the same buoyancy/passive hinge approach, but the blade can now be constant cross section. The angle of attack is constant, so provisions are not required to twist the blade. The anchor/base needs to be tall enough to get most of the blade out of the seafloor boundary layer, but the loads on the base will be limited to reacting the torque and keeping the entire system from washing downstream. The blade will keep itself vertical using its buoyancy. The orientation axis will now be either the same as or parallel to the power axis. The arm will sweep through approximately 90-110 degrees.

This configuration is similar to the BioPower Systems bioSTREAM approach, but our buoyant blade and associated features greatly reduce the structural requirements on the foundation. Debris buildup and fouling is reduced or eliminated by removing the mounting pole.

In single units, or in small installations such as cabin power from a stream or small river, a system is "installed" by dropping a complete unit into a suitable spot and running the electrical cables or hydraulic tether to shore where the power would be used. The system will land on its base, self-orient, and begin producing power immediately. Retrieving the same smaller system for re-deployment or servicing would be as easy as lifting it by its power tether.

Figure 6:
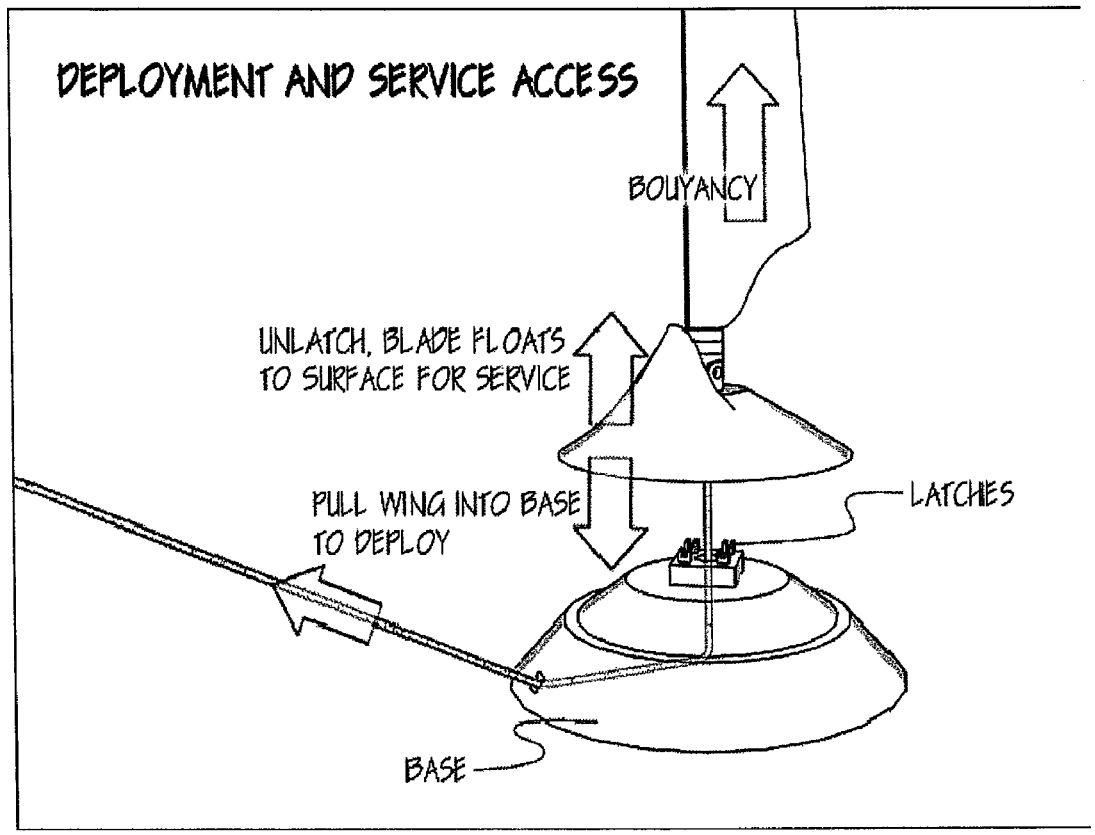
FIG. 6 is a view of a cable "haul-down" system employed during servicing and installation.

Larger systems are installed by locating and placing the base/foundations on the sea floor, then running power and communication infrastructure to each location. Base/foundations contain docking station(s) for the power generating equipment. "Powerheads" containing all the moving and service parts are then winched down to each base/foundation, where they self-orient and are available for power generation (FIG. 6).

A variable-buoyancy feature would also be useful in this operation. For servicing, the blade/powerhead could be simply released from the base. It would float to the surface for retrieval. For installation, it's buoyancy would be minimized so that it would naturally sink or be only slightly buoyant, so a light tether would be enough to lead it into it's base.

Although it is possible for the larger units to be self-contained and "dumb", it's more likely that larger installations will be fully instrumented for both data gathering purposes as well as constant operational optimization. For instance, measure torque as the blade moves one way, and then compare it to the torque as the blade moves the other way. If they are not equal, re-orient the device to balance the torques. Other process variables such as blade twist and pitch can also be varied continuously to insure that we are operating at the maximum power generation level for the highly variable conditions as tide changes or river current eddies. The data gathering parts and pieces may be contained in the power heads, but communicate through the base infrastructure.

Blade/powerheads connect to the base using wet contacts, hydraulic fittings, or inductive couplings in the case of direct electrical generation. Base connections can be back-purged with fresh water or benign protective fluids after coupling.

It may be possible to use the immersive fluid as the working fluid in a hydraulic/electric system. For instance, in a river installation, river water can be pumped by the system to a shore-based power station. In seawater, corrosion and bio-fouling can cause many problems. It may be possible to eliminate bio-fouling issues by treating (sterilizing) the seawater working fluid stream before use with an electrolytic cell. Corrosion concerns would remain. The working fluid would be simply returned to the body of water or used for a secondary use such as irrigation. In some instances the device may be more useful as an irrigation pump, with electrical power generation a secondary benefit.

Scaling the design is an issue. Roughly, as the blade gets twice as long, spar thickness doubles which greatly increases strength; the area, drag and lift go up four times; and the volume and buoyancy goes up eight times. Tip speed (which may be the limiting variable) doubles if the oscillation period is maintained, so there are design tradeoffs.

Many advanced hydrodynamic features seen on aircraft, especially STOL (Short TakeOff and Landing) aircraft may apply to blade design. Variable camber foils, flaps, slots, tip plates, axial flow dams, vortex generators and other enhancements may find a place in blade design.

Multiple Blades may be combined in various ways to, for instance, counteract and reduce the torque load on the foundation or increase hydrodynamic efficiency or torque. Two or more blades can work in series (one in the other's wake) to take advantage of hydrodynamic effects. Two blades can work side-by-side, in opposition or synchronization, to realize hydrodynamic advantages. Many blades, with or without synchronization, can share a single foundation structure to spread and share the foundation loads and systems.

Although preferred embodiments are disclosed herein for purposes of illustration, it should be understood that various changes, modifications and substitutions can be incorporated in the embodiments without departing from the invention, which is defined by the claims which follow.

What is claimed is:

1. A system for extracting power from tidal or other water action in a water region having a bottom surface, comprising:
   a base assembly positionable on the bottom surface of the water region;
   a buoyant blade assembly mounted on the base assembly, the blade assembly including at least one buoyant blade member, the buoyant blade assembly being arranged relative to the base assembly so that when the base assembly is positioned on the bottom surface of the water region, the buoyant blade member is submerged, wherein the blade assembly or the blade member is capable of oscillating back and forth through an angle, wherein the buoyant blade member is mounted such that when the base assembly is positioned properly in the water region relative to the direction of the tide or other water action, torque is generated by the oscillating movement of the buoyant blade assembly or the buoyant blade member as the tidal or other water action moves past the submerged blade member, and wherein the base assembly includes a power-extracting mechanism responsive to the torque generated by the tide or other action of water or the buoyant blade assembly; and
   a system for coupling the torque to the power-extracting mechanism.

2. The system of claim 1, wherein the power-extracting mechanism is an electricity generating mechanism.

3. The system of claim 1, wherein the buoyant blade member oscillates about a horizontal axis which extends in the direction of the tide or water action to generate torque.

4. The system of claim 3, wherein the oscillation of the buoyant blade member covers an angle of between 90-160°.

5. The system of claim 3, wherein the buoyant blade assembly, including the buoyant blade member, is rotatable relative to the base assembly about a vertical axis to accommodate changes in the direction of water action.

6. The system of claim 3, wherein the buoyant blade member is compliantly mounted.

7. The system of claim 3, wherein the buoyant blade member is capable of twisting about a vertical axis.

8. The system of claim 3, wherein the buoyant blade member has first and second vertical portions, wherein the second vertical portion is twistable about a hinge portion extending vertically along a forward edge of the first vertical portion.

9. The system of claim 8, wherein individual portions of the buoyant blade member are separately twistable by separate actuators.

10. The system of claim 1, wherein the buoyant blade assembly includes a first portion having an arm extending horizontally outwardly and wherein the buoyant blade member extends vertically from the vicinity of a free end of the arm, and wherein the buoyant blade assembly oscillates about a vertical axis in response to the movement of water passing by the buoyant blade assembly.

11. The system of claim 9, wherein the angle of oscillation is within the range of 90-110°.

12. The system of claim 1, wherein the buoyant blade member is movable in the direction of the water flow, thereby resulting in shedding of debris accumulated on the buoyant blade member.

13. The system of claim 1, wherein the buoyant blade assembly is detachable from the base assembly and is capable of floating to a surface of the water region upon detachment.

14. The system of claim 1, wherein the buoyant blade member has a variable buoyancy capability.

15. The system of claim 2, wherein the electricity generating mechanism is 1) a directly coupled generator or alternator, 2) a gearbox generator or alternator or 3) a hydraulic motor/generator or alternator.

16. The system of claim 1, wherein the buoyant blade assembly includes a plurality of buoyant blade members.

\* \* \* \* \*

UNITED STATES PATENT AND TRADEMARK OFFICE
CERTIFICATE OF CORRECTION

| | | |
|---|---|---|
| PATENT NO. | : 7,839,009 B2 | Page 1 of 1 |
| APPLICATION NO. | : 12/392369 | |
| DATED | : November 23, 2010 | |
| INVENTOR(S) | : Philip A. Rink | |

It is certified that error appears in the above-identified patent and that said Letters Patent is hereby corrected as shown below:

Claim 1, col. 5 line 28: the word "or" should be "on".

Signed and Sealed this
Eighth Day of February, 2011

David J. Kappos
*Director of the United States Patent and Trademark Office*